(12) United States Patent
Scott et al.

(10) Patent No.: US 12,401,231 B2
(45) Date of Patent: *Aug. 26, 2025

(54) SYSTEM AND METHOD FOR WIRELESS POWER TRANSMISSION AND/OR FIELD DETECTION

(71) Applicant: Reach Power, Inc., Redwood City, CA (US)

(72) Inventors: Hunter Scott, Redwood City, CA (US); Gustavo Navarro, Redwood City, CA (US); Robert J. Tong, Redwood City, CA (US); Christopher Joseph Davlantes, Redwood City, CA (US)

(73) Assignee: Reach Power, Inc., Redwood City, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/593,698

(22) Filed: Mar. 1, 2024

(65) Prior Publication Data
US 2024/0204575 A1   Jun. 20, 2024

Related U.S. Application Data

(63) Continuation of application No. 18/368,822, filed on Sep. 15, 2023, now Pat. No. 11,955,817.

(60) Provisional application No. 63/408,764, filed on Sep. 21, 2022, provisional application No. 63/500,050, filed on May 4, 2023.

(51) Int. Cl.
*H02J 50/60* (2016.01)
*H02J 50/20* (2016.01)
*H02J 50/40* (2016.01)

(52) U.S. Cl.
CPC .............. *H02J 50/60* (2016.02); *H02J 50/20* (2016.02); *H02J 50/40* (2016.02)

(58) Field of Classification Search
CPC .............. H02J 50/60; H02J 50/20; H02J 50/40
See application file for complete search history.

(56) References Cited

U.S. PATENT DOCUMENTS

| | | | |
|---|---|---|---|
| 10,985,617 B1 * | 4/2021 | Johnston | H02J 50/005 |
| 11,955,817 B1 * | 4/2024 | Scott | H02J 50/40 |
| 2002/0101943 A1 | 8/2002 | Proctor | |
| 2007/0287508 A1 * | 12/2007 | Telefus | H02J 50/10 |
| | | | 455/572 |
| 2017/0085126 A1 * | 3/2017 | Leabman | G01S 1/68 |
| 2017/0085127 A1 * | 3/2017 | Leabman | H02J 50/90 |
| 2017/0358950 A1 | 12/2017 | Zeine et al. | |
| 2018/0006375 A1 * | 1/2018 | Black | H01Q 15/002 |
| 2018/0024227 A1 * | 1/2018 | Shiba | G01S 7/292 |
| | | | 342/175 |
| 2019/0348849 A1 * | 11/2019 | Kun | H02M 3/158 |
| 2020/0059117 A9 | 2/2020 | Hajimiri et al. | |
| 2020/0083754 A1 * | 3/2020 | Tian | H02J 50/60 |

(Continued)

*Primary Examiner* — Daniel Kessie
*Assistant Examiner* — Brian K Baxter
(74) *Attorney, Agent, or Firm* — Jeffrey Schox; Samuel Rosenthal

(57) ABSTRACT

A system for wireless power transmission, preferably including one or more power transmitters, detectors, and/or processing modules, and optionally including one or more power receivers and/or auxiliary sensors. A method for field detection, preferably including transmitting power, receiving latent scattering signals, analyzing the scattering signals, and/or acting based on the analysis.

21 Claims, 4 Drawing Sheets

(56) References Cited

U.S. PATENT DOCUMENTS

| | | |
|---|---|---|
| 2021/0135510 A1* | 5/2021 | Lin .................... H02J 50/60 |
| 2021/0150873 A1 | 5/2021 | Shouldice et al. |
| 2021/0234408 A1* | 7/2021 | Abiri .................. B60L 53/36 |
| 2021/0391754 A1* | 12/2021 | Smith .................. H02J 50/10 |
| 2022/0026530 A1 | 1/2022 | Wu et al. |
| 2022/0103022 A1* | 3/2022 | Bell .................... G06V 30/224 |
| 2022/0131421 A1 | 4/2022 | Park |
| 2022/0224165 A1* | 7/2022 | Nugent, Jr. ............ H02J 50/402 |
| 2023/0155422 A1* | 5/2023 | Nishikawa ............. H02J 50/20 |
| | | 307/104 |
| 2023/0283105 A1* | 9/2023 | Lee .................... H02J 50/20 |
| | | 307/104 |
| 2023/0352984 A1* | 11/2023 | Leabman ............... H02J 50/20 |

* cited by examiner

SYSTEM AND METHOD FOR WIRELESS POWER TRANSMISSION AND/OR FIELD DETECTION

CROSS-REFERENCE TO RELATED APPLICATIONS

This application is a continuation of U.S. patent application Ser. No. 18/368,822, filed on 15 Sep. 2023, which claims the benefit of U.S. Provisional Application Ser. No. 63/408,764, filed on 21 Sep. 2022, and of U.S. Provisional Application Ser. No. 63/500,050, filed on 4 May 2023, each of which is incorporated in its entirety by this reference.

TECHNICAL FIELD

This invention relates generally to the wireless power transmission field, and more specifically to a new and useful system and method for wireless power transmission and/or field detection.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2A:
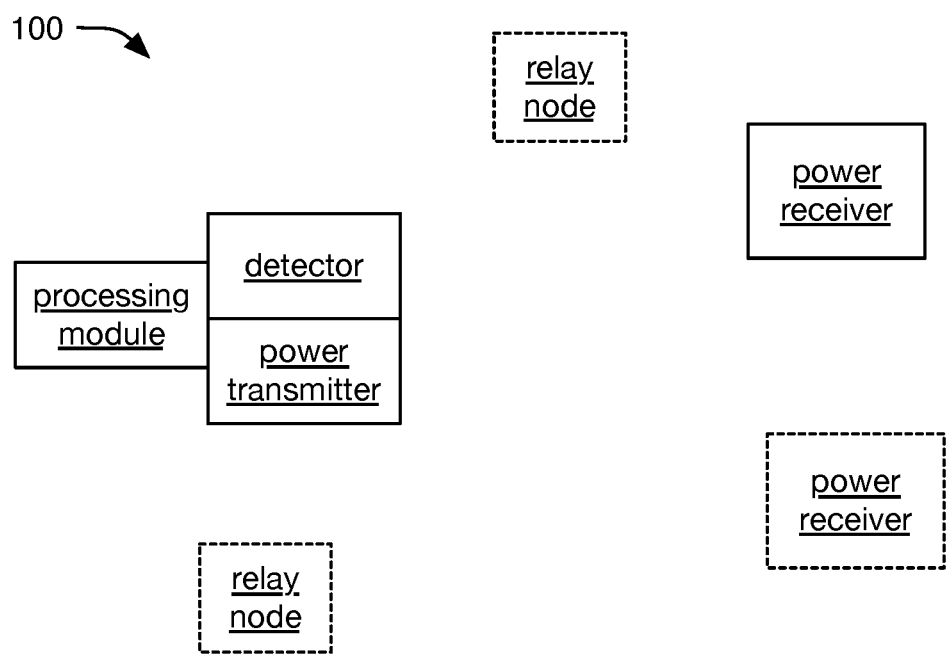
FIG. 2A is a schematic representation of an embodiment of a system for wireless power transmission.

A system 100 for wireless power transmission and/or field detection preferably includes one or more power transmitters (or equivalently, "transmit nodes"), detectors, and/or processing modules (e.g., as shown in FIG. 2A). The system can optionally include one or more power receivers (or equivalently, "receive nodes") and/or auxiliary sensors (e.g., cameras, ultrasound sensors, ultra wideband sensors, proximity sensors, weight sensors, audio sensors, etc.). In some examples, the system can optionally include one or more nodes (e.g., transmit nodes, receive nodes, relay nodes, hybrid nodes, etc.) such as described in U.S. patent application Ser. No. 18/108,312, filed 10 Feb. 2023 and titled "SYSTEM AND METHOD FOR WIRELESS POWER NETWORKING", which is herein incorporated in its entirety by this reference; for example, the functionality and/or arrangements described herein regarding the power transmitters and/or power receivers may additionally or alternatively be achieved using one or more such nodes, such as wherein a power transmitter may include one or more transmit nodes, relay nodes, and/or hybrid nodes, and/or wherein a power receiver may include one or more receive nodes, relay nodes, and/or hybrid nodes. In some examples, one or more nodes of the system (e.g., one or more receive nodes, relay nodes, and/or hybrid nodes) can optionally include one or more bidirectional RF circuits such as described in U.S. patent application Ser. No. 18/203,810, filed 31 May 2023 and titled "BIDIRECTIONAL RF CIRCUIT AND METHOD OF USE", which is herein incorporated in its entirety by this reference. However, the system can additionally or alternatively include any other suitable elements in any suitable arrangement. The system 100 preferably functions to enable wireless power transmission between the power transmitter(s) and the power receiver(s) (e.g., as described in U.S. patent application Ser. No. 17/006,242, filed 28 Aug. 2020 and titled "METHOD AND SYSTEM FOR WIRELESS POWER DELIVERY", which is herein incorporated in its entirety by this reference). The system 100 is preferably operable to perform a method for field detection (e.g., the method 200 described herein). However, the system 100 can additionally or alternatively have any other suitable functionality.

Figure 1:
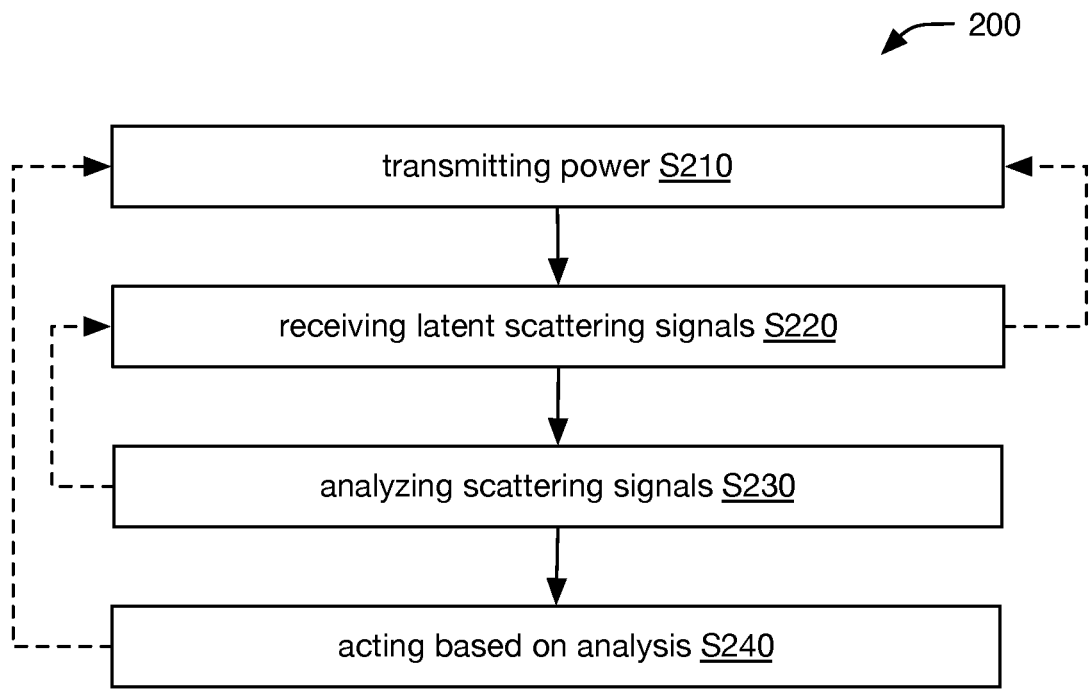
FIG. 1 is a schematic representation of an embodiment of a method for field detection.

A method 200 for wireless power transmission and/or field detection preferably includes transmitting power S210, receiving latent scattering signals S220, analyzing the scattering signals S230, and/or acting based on the analysis S240 (e.g., as shown in FIG. 1). However, the method can additionally or alternatively include any other suitable elements performed in any suitable manner. The method 200 is preferably performed using the system 100 described herein. However, the method can additionally or alternatively be performed using any other suitable systems.

The method 200 preferably functions to enable latent detection (e.g., detection based on latent scattering of radiation transmitted for other purposes, such as for wireless power transmission; wherein no or substantially no detection-specific probe signals are emitted and/or needed to be emitted to enable the detection) of objects (e.g., moving objects, such as humans and/or other living organisms) incident upon wireless power transmission regions, such as in a passive radar scheme (e.g., passive coherent location scheme). For example, the method can function to detect such objects based on scattering of radiation transmitted for wireless power transmission (and/or for any other suitable purposes). However, the method can additionally or alternatively function to perform active detection (e.g., detection based on scattering of detection probe signals, such as radiation emitted for the primary purpose of detecting objects) and/or any other suitable functionalities.

2. System

2.1 Power Transmitter

The power transmitter preferably functions to transmit power wirelessly (e.g., to or toward one or more power receivers, relay nodes, etc.). The power transmitter preferably outputs electromagnetic radiation (more preferably, propagating or "far-field" radiation, but additionally or alternatively evanescent or "near-field" radiation).

The transmitter(s) of the system preferably includes one or more transmission elements (e.g., elements configured to transmit electromagnetic radiation, such as RF and/or microwave power) such as transmission antennas. The antennas and/or other transmission elements can be narrowband elements (e.g., quality factor greater than a threshold, such as 50, 75, 100, 125, 150, 200, 250, 500, 30-100, 100-150, 150-300, 300-1000, or greater than 1000, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. The transmission elements can optionally include one or more frequency adaptation elements (e.g., configured to control the transmission and/or resonance frequencies of the transmission elements). In some embodiments, the transmitter includes one or more elements such as described (e.g., regarding the transmitters of the system) in U.S. patent application Ser. No. 16/001,725, filed 6 Jun. 2018 and titled "Method and System for Wireless Power Delivery", which is herein incorporated in its entirety by this reference.

Figure 2B:
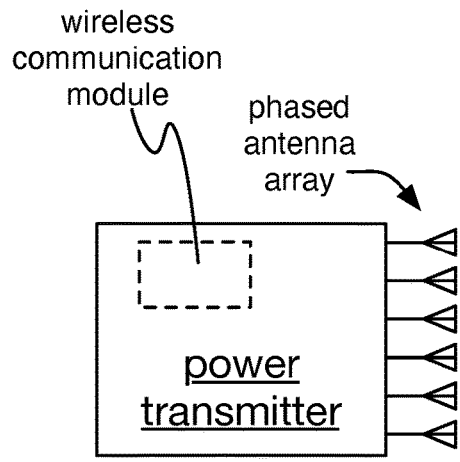
FIGS. 2B-2C are schematic representations of an example of a transmitter and receiver, respectively, of the system.

The power transmitter preferably includes a plurality of controllable (e.g., adaptive) transmission elements (e.g., loops, monopoles, dipoles, etc.), such as phase- and/or amplitude-controllable elements. For example, the transmission elements can define one or more controllable (e.g., adaptive) antenna arrays (e.g., linear array, planar array, 3-D array, etc.; phased array, electronically controllable array, etc.), such as shown by way of example in FIG. 2B.

The transmission elements preferably includes a plurality of active elements (e.g., elements, such as antennas, configured to be actively driven by feeds), more preferably independently controllable active antennas (e.g., wherein each active antenna can be individually controlled independent of all other active antennas of the system; wherein groups of active antennas can be controlled together, wherein each group is controllable independently from all other groups; etc.). In a first variation, the amplitude and/or phase at which each active antenna is driven can be independently controlled (e.g., via a separate IQ modulator or phase shifter for each active antenna). In a second variation, the active antennas are separated into one or more antenna groups, wherein the antennas of a group are controlled together (e.g., via a single IQ modulator or phase shifter for each group). For example, the antennas of a group can have a fixed phase offset (e.g., zero offset, such as wherein all antennas of the group have the same phase as each other; non-zero offset; etc.) with respect to each other (e.g., wherein the fixed phase offset is defined by differences in trace lengths between the IQ modulator or phase shifter and each antenna). However, the active antennas can additionally or alternatively be configured in any other suitable manner.

The transmission elements can additionally or alternatively include one or more passive antennas (e.g., configured to electrically and/or resonantly couple to one or more of the active antennas, thereby altering transmission characteristics of the transmitter). In one example, the system is configured to control (e.g., via switches, such as software-controlled switches; via elements with variable electrical properties, such as variable capacitors; etc.) electrical coupling (e.g., connection, resonant coupling, etc.) and/or decoupling of one or more of the passive antennas to one or more electrical components (e.g., passive components, such as resistors, capacitors, and/or inductors; antennas, such as one or more of the active antennas and/or other passive antennas; etc.). In a first example, a plurality of passive antennas can be electrically connected to and/or disconnected from each other (e.g., via switches operable to electrically connect two or more such antennas). In a second example, variable capacitors (e.g., varactors) and/or other variable (e.g., continuously-variable) elements are electrically coupled (e.g., electrically connected) to one or more passive antennas, enabling control of the loading of the passive antennas and/or their coupling to other antennas (e.g., other passive antennas, active antennas, etc.) in the array and/or their feeds (e.g., wherein varying the properties of one or more of the variable elements coupled to the antennas can function to control the net pattern of the array). In a specific example of this second example, an adaptive antenna array includes a single active antenna and a plurality of passive antennas, wherein one or more of the passive antennas are electrically coupled to one or more variable components.

Although referred to herein as antennas (e.g., active antennas, passive antennas, etc.), a person of skill in the art will recognize that the transmission elements can additionally or alternatively include transmission elements (e.g., active transmission elements, passive transmission elements, etc.) of any other suitable types. Although referred to herein as an antenna array, a person of skill in the art will recognize that the transmission elements can additionally or alternatively include arrays of any other suitable transmission elements and/or transmission elements in any other suitable arrangements (e.g., arrangements other than arrays, such as aperiodic arrangements).

The transmitter is preferably coupled to (e.g., electrically coupled to, such as connected by conductive wires; configured to receive power from; etc.) one or more power sources. The power sources can include remote power sources (e.g., power grid, external power generator, external power storage device, etc.) and/or power storage modules (e.g., wherein the power delivery device includes the power storage module(s)). The power storage module preferably includes a battery, more preferably a secondary battery but alternatively a primary battery, but can additionally or alternatively include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, and/or any other suitable power source. The secondary battery can have a lithium phosphate chemistry, lithium ion polymer chemistry, lithium ion chemistry, nickel metal hydride chemistry, lead acid chemistry, nickel cadmium chemistry, metal hydride chemistry, nickel manganese cobalt chemistry, magnesium chemistry, or any other suitable chemistry. The primary battery can have a lithium thionyl chloride chemistry, zinc-carbon chemistry, zinc chloride chemistry, alkaline chemistry, oxy nickel hydroxide chemistry, lithium-iron disulfide chemistry, lithium-manganese oxide chemistry, zinc-air chemistry, silver oxide chemistry, or any other suitable chemistry.

The transmitters can additionally or alternatively be configured to transmit and/or receive energy in any other suitable form (e.g., sonic, optical, etc.), and/or to perform any other suitable role(s).

The transmitters preferably each include a wireless communication module, but can additionally or alternatively include wired communication modules or any other suitable communication modules, or can omit communication modules. The wireless communication modules preferably support (e.g., enable communication using) one or more wireless communication protocols (e.g., WiFi, Bluetooth, BLE, NFC, RF, IR, Zigbee, Z-wave, etc.). However, the transmitters can additionally or alternatively include any other suitable elements.

In some embodiments, the transmitter includes one or more elements such as described (e.g., regarding the transmitters of the system) in U.S. patent application Ser. No. 17/006,242, filed 28 Aug. 2020 and titled "METHOD AND SYSTEM FOR WIRELESS POWER DELIVERY", which is herein incorporated in its entirety by this reference.

However, the power transmitter can additionally or alternatively include any other suitable elements in any suitable arrangement.

2.2 Power Receiver

Figure 2C:
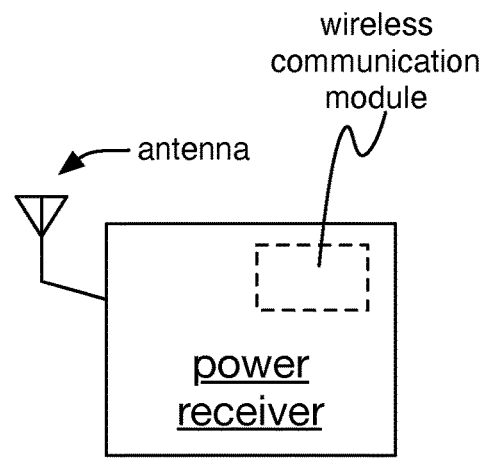

The system can optionally include one or more power receivers. The power receivers can function to receive power wirelessly (e.g., power transmitted by one or more power transmitters). The power receiver preferably includes one or more antennas (e.g., configured to receive electromagnetic radiation transmitted by the transmitters), such as shown by way of example in FIG. 2C. The receivers can optionally include and/or be electrically coupled to (e.g., configured to deliver electrical power to) one or more client devices (e.g., batteries and/or battery-containing devices, such as smart phones and/or other electrical and/or electronic user devices). The receivers can optionally include one or more buffer energy stores (e.g., batteries), such as a battery electrically coupled between the antenna(s) and the client device (e.g., between the antenna(s) and an electrical output configured to connect to the client device), which can function as a buffer between the antennas (which may provide power at an uneven rate and/or with uneven characteristics) and the client device (which may require and/or benefit from power provision at a substantially constant rate and/or with substantially constant characteristics, which may be temporarily disconnected from the receiver, etc.). In some embodiments, the receivers include one or more elements such as described (e.g., regarding the receivers of the system) in U.S. patent application Ser. No. 16/001,628, filed 6 Jun. 2018 and titled "SYSTEM AND METHOD FOR WIRELESS POWER RECEPTION", and/or in U.S. patent application Ser. No. 17/006,242, filed 28 Aug. 2020 and titled "METHOD AND SYSTEM FOR WIRELESS POWER DELIVERY", each of which is herein incorporated in its entirety by this reference.

The antennas preferably function to receive power (e.g., electromagnetic radiation transmitted to the receiver, preferably propagating or "far-field" radiation but additionally or alternatively evanescent or "near-field" radiation) and to couple the received power into the receiver. The antennas can include directional antennas, omnidirectional antennas, and/or any other suitable antennas.

The antennas can include directional antennas, omnidirectional antennas, and/or any other suitable antennas. The antennas can include narrowband elements (e.g., quality factor greater than a threshold, such as 50, 75, 100, 125, 150, 200, 250, 500, 30-100, 100-150, 150-300, 300-1000, or greater than 1000, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. In some embodiments, some or all of the antennas of the transmitter (e.g., active antennas, passive antennas, etc.) and/or receiver include one or more tightly-coupled arrays of resonators, but can additionally or alternatively include a loosely-coupled array, a sparse array, a single resonator, and/or any other suitable antenna elements. The resonators can include resonant loops, cross-resonators, split-ring resonators, electro-inductive-capacitive resonators, other physically small resonators (e.g., small relative to their resonance wavelength), and/or any other suitable resonators. However, the resonators can be otherwise configured.

The antenna(s) can optionally include multiple arrays (and/or other resonator arrangements) arranged with different orientations, which can function to efficiently couple to radiation of different polarizations (e.g., orthogonal polarizations). In a first embodiment, an antenna includes parallel resonator layers (e.g., parallel resonator arrays), each layer having a different in-plane resonator orientation (e.g., orthogonal orientations, oriented at oblique angles, etc.). In a second embodiment, an antenna includes resonators on non-parallel planes (e.g., orthogonal planes, planes oriented at oblique angles, etc.). However, the antenna(s) can additionally or alternatively include any other suitable resonators and/or other antenna elements, and can have any other suitable arrangement. The antenna(s) can be a metamaterial or have any other suitable configuration.

Although referred to herein as antennas (e.g., active antennas, passive antennas, etc.), a person of skill in the art will recognize that the receiver antennas can additionally or alternatively include reception elements of any other suitable types.

The receivers can additionally or alternatively be configured to receive energy in any other suitable form (e.g., sonic, optical, etc.), and/or to perform any other suitable role(s). In one embodiment, all or some of the transmitters can additionally function as receivers and/or all or some of the receivers can additionally function as transmitters. For example, the system can include a plurality of equivalent devices, each of which can wirelessly transmit power to and receive power from each of the other devices.

The receivers preferably each include a wireless communication module, but can additionally or alternatively include wired communication modules or any other suitable communication modules, or can omit communication modules. The wireless communication modules preferably support (e.g., enable communication using) one or more wireless communication protocols (e.g., WiFi, Bluetooth, BLE, NFC, RF, IR, Zigbee, Z-wave, etc.). The communication module(s) preferably enable communication between some or all nodes of the system (e.g., between each receiver and one or more transmitters, between any two nodes, etc.), such as enabling direct communication, multi-hop communication, and/or communication mediated by one or more communication hubs. However, the receivers can additionally or alternatively include any other suitable elements.

In some embodiments, the transmitters and receivers may have an arbitrary and/or dynamic arrangement with respect to each other. In one example, the system includes a transmitter with a fixed position, and a plurality of receivers, each of which undergo numerous changes in position and orientation (e.g., with respect to the transmitter, each other, etc.) over time. The system can optionally be arranged in a setting in which other nearby objects (e.g., obstacles to wireless power transmission) can also have an arbitrary and/or dynamic arrangement with respect to the elements of the system. However, the system can define any other suitable arrangements.

In some embodiments, the system includes one or more elements (and/or the entire system) such as described in U.S. patent application Ser. No. 16/001,725, filed 6 Jun. 2018 and titled "Method and System for Wireless Power Delivery", which is herein incorporated in its entirety by this reference.

However, the power receiver can additionally or alternatively include any other suitable elements in any suitable arrangement.

2.3 Detector

The detector preferably functions to detect scattered radiation (e.g., scattering of the power transmitted by a power transmitter).

The detector preferably includes one or more antennas. Each antenna preferably has the same (or substantially the same) polarization as the power transmitter (or as one or more of multiple power transmitters of the system). However, the antennas can additionally or alternatively have any other suitable polarizations. Each detector antenna is preferably an omnidirectional antenna. However, the detector can additionally or alternatively include directional antennas (e.g., high-gain antennas) and/or antennas having any other suitable directionality characteristics.

In some embodiments, one or more detector antennas can be integrated with the power transmitter and/or power receiver. For example, one or more detector antennas are integrated into the phased array of the power transmitter (e.g., at or near the center of the array, along the side of the array, at any other suitable location within the array, etc.). Additionally or alternatively, one or more detector antennas can be attached to the periphery of the power transmitter and/or power receiver (e.g., in, on, and/or around a bezel surrounding the phased array), and/or integrated with the power transmitter and/or power receiver in any other suitable manner.

Additionally or alternatively, one or more detector antennas can be arranged near (e.g., but not integrated with) one or more power transmitters and/or power receivers. For example, detector antennas can be arranged above, below, and/or to the side of one or more power transmitters and/or power receivers. These detector antennas can be arranged within a threshold distance of the nearby power transmitter and/or receiver (e.g., within 1, 2, 5, 10, 20, and/or 50 ft, etc.). However, the detector antennas can additionally or alternatively have any other suitable arrangement relative to a nearby power transmitter and/or power receiver.

Additionally or alternatively, one or more detector antennas can be arranged at any other suitable locations within the system. For example, one or more detector antennas can be arranged partway between (e.g., and slightly off-axis from) a power transmitter and a power receiver (e.g., wherein the power transmitter is operable to transmit power to the power receiver). In one example, a detector antenna can be arranged near an axis defined between a power transmitter and power receiver, but at a sufficient distance away from this axis such that a line-of-sight power transmission (e.g., defining or substantially defining a Gaussian beam) from the power transmitter to the power receiver will not cause a significant amount of the transmitted radiation to be incident upon the detector antenna (e.g., in the absence of scattering by other objects within the beam).

In some embodiments, the system may include one or more detector antennas that are spatially separated from the power transmitter(s) by a substantial distance (e.g., greater than 1, 2, 5, 10, 20, and/or 50 ft, etc.), which may enable detection modalities such as bistatic radar detection, multistatic radar detection, and the like. Additionally or alternatively, the system may include multiple detector antennas that are spatially separated from each other by a substantial distance (e.g., greater than 1, 2, 5, 10, 20, and/or 50 ft, etc.), which may enable detection of additional information regarding the scattered signals.

However, the system can additionally or alternatively include any other suitable detector antennas in any suitable arrangement.

2.4 Auxiliary Sensors

The system can optionally include one or more auxiliary sensors (e.g., cameras, ultrasound sensors, ultra wideband sensors, proximity sensors, weight sensors, audio sensors, etc.). The auxiliary sensor(s) can function to provide supplemental sensing information regarding objects in and/or around the transmitted fields. For example, the auxiliary sensor(s) can function to detect object presence in and/or around the transmitted fields (e.g., detecting presence of objects not detected based on scattering signals received at the detector antennas), and/or can function to characterize the type of object(s) located in and/or around the transmitted fields (e.g., characterize objects detected based on scattering signals received at the detector antennas, such as providing information for sensor fusion techniques).

In one embodiment, the system includes one or more auxiliary sensors operable to detect stationary, substantially stationary, and/or slowly-moving people (and/or other animals), such as people that are not moving sufficiently quickly to be detected based on Doppler analysis of signals scattered from them. In examples, such auxiliary sensor(s) could include sensors configured to detect signatures indicative of breathing and/or heartbeats.

However, the system can additionally or alternatively include any other suitable auxiliary sensor(s), or can include no such sensors.

2.5 Processing Module

The processing module preferably functions to analyze detected signals (e.g., sampled by the detectors) and/or to control other elements of the system 100. The processing module can include one or more computing elements (e.g., computers and/or components thereof, which can include, in examples: processing elements such as CPUs, GPUs, ASICs, etc.; storage elements such as RAM, persistent storage elements, etc.; and the like), and/or one or more communication elements (e.g., wired communication elements, wireless communication elements, etc.).

The processing module is preferably operable to receive information from the one or more detectors. For example, the processing module can receive information (e.g., scattering signals) indicative of the scattered radiation detected at the detectors (and/or derivatives thereof, such as analyzed data determined based on the detected scattered radiation).

The processing module is preferably operable to analyze (e.g., classify) the received information. For example, the processing module can be operable to classify the scattering signals (e.g., classify as nominal vs. anomalous, safe vs. unsafe, static human vs. moving human vs. non-human object, etc.).

The processing module can optionally be operable to act based on the analysis of the received signals. For example, the processing module can be operable to control the power transmitter in response to the analysis. Such power transmitter control could include altering the power transmitter's transmissions (e.g., halting transmission, redirecting transmission, such as by reconfiguring the phased array, reducing transmission output power, etc.) in response to detection of an anomalous and/or unsafe condition (e.g., condition indicative of field incursion, such as by a human and/or other living organism).

However, the system 100 can additionally or alternatively include any other suitable elements in any suitable arrangement and/or can have any other suitable functionality.

3. Method

3.1 Transmitting Power

Figure 3A:
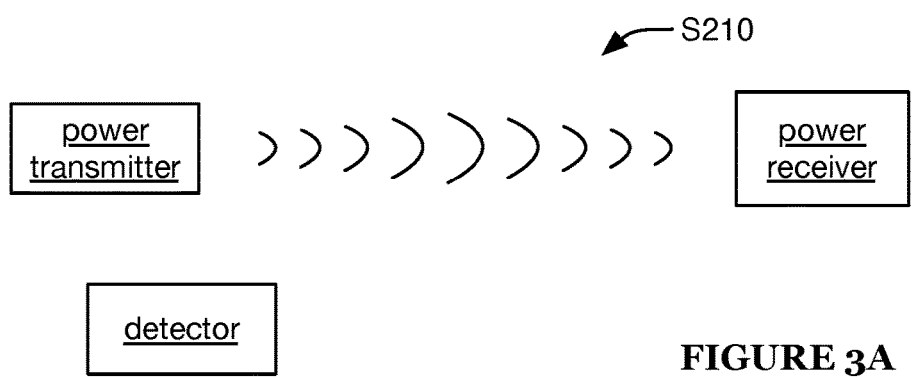
FIGS. 3A-3D are schematic representations of a first, second, third, and fourth example, respectively, of portions of the method.
Figure 3B:
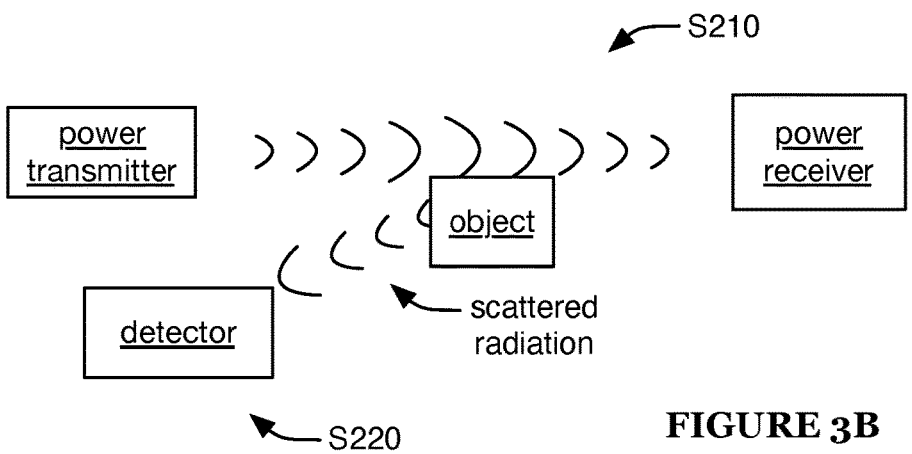
Figure 3C:
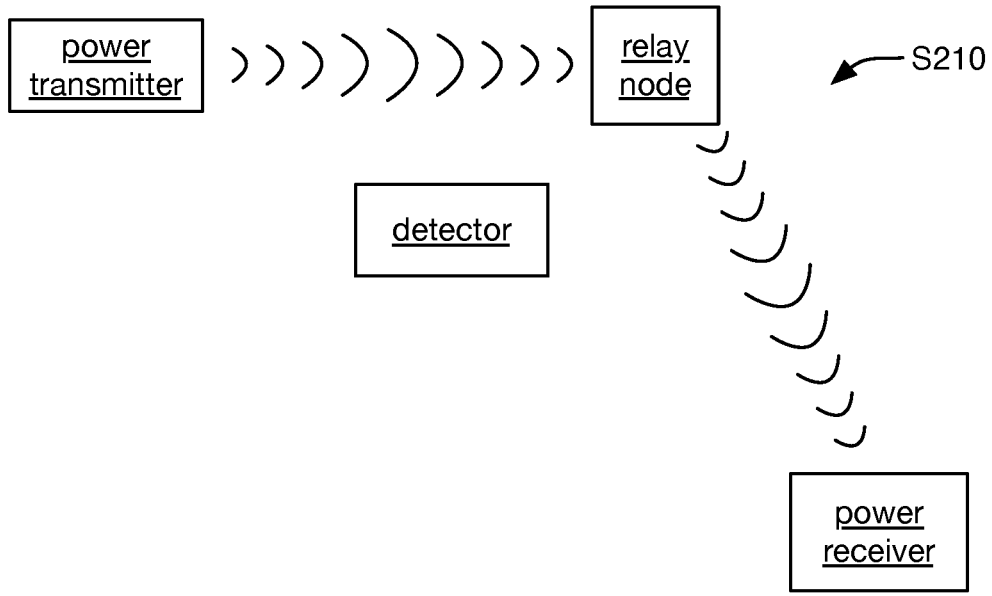
Figure 3D:
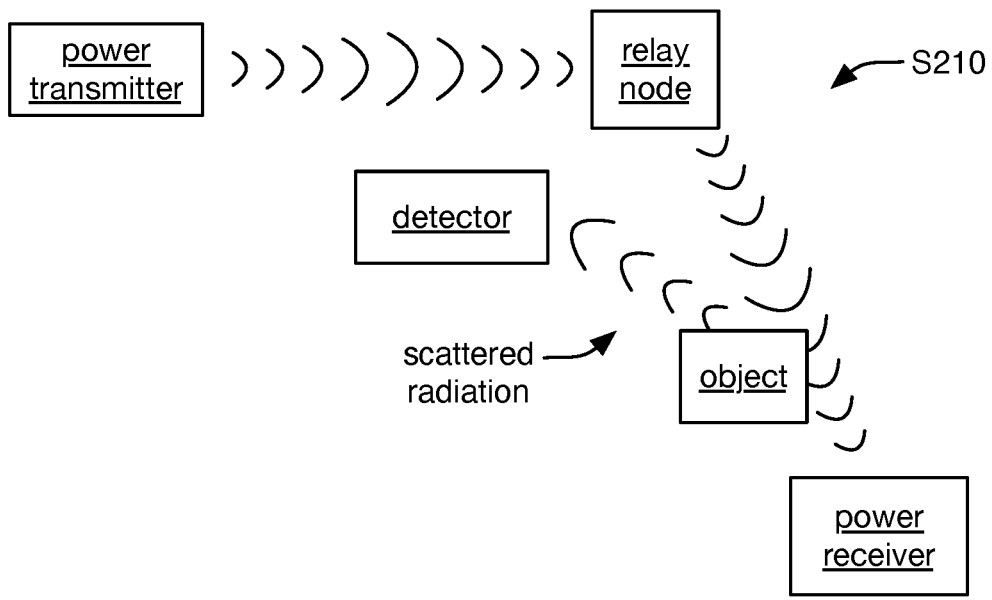

Transmitting power S210 preferably functions to wirelessly transfer power (e.g., from one or more power transmitters to one or more power receivers). S210 is preferably performed at the one or more power transmitters (e.g., as shown in FIGS. 3A-3B) and/or at one or more relay nodes (e.g., as shown in FIGS. 3C-3D).

S210 preferably includes transmitting a pure (or substantially pure) sine wave at a static (or quasi-static, substantially static, etc.) frequency (e.g., RF frequency). However, S210 can additionally or alternatively include transmitting radiation of multiple frequencies (e.g., two or more pure or substantially pure sine waves); waveforms including one or more harmonics; non-sinusoidal waveforms, such as square waveforms; and/or any other suitable waveforms. Further, S210 can additionally or alternatively include transmitting waveforms with changing frequencies (e.g., frequencies ramping up and/or down, chirped frequencies such as FMCW radar probe signals, waveforms including frequency-modulation encodings and/or phase-modulation encodings, etc.), and/or modulating the transmitted waveforms in any other suitable manner (e.g., to facilitate collection of additional information based on the scattered signals). However, S210 can additionally or alternatively include transmitting any other suitable waveforms in any suitable manner.

S210 can optionally include receiving power (e.g., at one or more power receivers), preferably wirelessly receiving the power transmitted in S210 (e.g., the power transmitted by the one or more power transmitters) but additionally or alternatively receiving any other suitable power in any suitable manner.

In some embodiments, S210 can include transmitting (and/or receiving) power such as described (e.g., regarding the 'method for wireless power delivery') in U.S. patent application Ser. No. 16/001,628, filed 6 Jun. 2018 and titled "SYSTEM AND METHOD FOR WIRELESS POWER RECEPTION", and/or in U.S. patent application Ser. No. 17/006,242, filed 28 Aug. 2020 and titled "METHOD AND SYSTEM FOR WIRELESS POWER DELIVERY", each of which is herein incorporated in its entirety by this reference. For example, S210 can include optimizing transmission to one or more power receivers by adjusting configuration parameters of the one or more power transmitters (e.g., of the phased array(s) thereof); in a specific example, this optimization can be enabled by measurement of power received (and/or power reception efficiency) at the power receiver(s) and/or by communication (e.g., of information indicative of such measurements) between the power receiver(s) and power transmitter(s) (e.g., wherein the power transmitter(s) can adjust operation based on communications indicative of such measurements, thereby testing multiple configurations, such as by implementing an optimization algorithm). In some embodiments (e.g., as described in U.S. patent application Ser. No. 16/001,628 and/or in U.S. patent application Ser. No. 17/006,242), S210 can include modifying power transmission parameters (e.g., moving one or more beam-like fields in one or more directions, such as sweeping a beam-like field across the azimuthal and/or elevation angles) in a manner that may enable additional information to be discerned from scattered signals (e.g., enabling implementation of one or more detection techniques such as synthetic aperture radar). In some examples, S210 can include one or more of the following: determining a first transmission configuration associated with a first receiver group, the first receiver group comprising a first subset of receivers, wherein determining the first transmission configuration can include performing a first optimum search for wireless power transmission to the first receiver group; determining a second transmission configuration associated with a second receiver group, the second receiver group comprising a second subset of receivers, wherein determining the second transmission configuration can include performing a second optimum search for wireless power transmission to the second receiver group; determining a charging plan (e.g., including one or more of a first duty cycle associated with the first transmission configuration and/or a second duty cycle associated with the second transmission configuration); and/or transmitting based on the first transmission configuration and/or the second transmission configuration (e.g., according to the charging plan). In some such examples, the first and/or second optimum search(es) can be performed and/or the charging plan can be determined such as described (e.g., regarding the 'method for wireless power delivery') in U.S. patent application Ser. No. 17/006,242, filed 28 Aug. 2020 and titled "METHOD AND SYSTEM FOR WIRELESS POWER DELIVERY", which is herein incorporated in its entirety by this reference.

Additionally or alternatively, S210 can include to relaying (e.g., redirecting, refocusing, reflecting, etc.) wirelessly transmitted power (e.g., to or toward one or more power receivers, relay nodes, etc.), such as using one or more relay nodes. In some embodiments, this is performed such as described in U.S. patent application Ser. No. 18/108,312, filed 10 Feb. 2023 and titled "SYSTEM AND METHOD FOR WIRELESS POWER NETWORKING", which is herein incorporated in its entirety by this reference.

Additionally or alternatively, S210 can include transmitting power wirelessly from the power receiver and/or from any other suitable elements.

Additionally or alternatively, S210 can include transmitting power wirelessly at one or more frequencies different than that used for wireless power transfer. For example, wireless power transfer may be conducted at and/or around a first frequency (e.g., 5.8 GHz), an S210 can additionally or alternatively include transmitting power wirelessly at one or more additional frequencies, preferably higher in frequency than the wireless power transfer frequency (e.g., 24 GHz, 60 GHz, etc.), which may enable superior spatial resolution in some embodiments.

However, S210 can additionally or alternatively include transmitting (and/or receiving) power in any other suitable manner.

3.2 Receiving Scattering Signals

Receiving scattering signals S220 preferably functions to sample information indicative of transmitted power scattering (e.g., scattering of power transmitted by one or more power transmitters, scattering of power relayed by one or more relay nodes, etc.). The scattering signals are preferably latent scattering signals (e.g., scattering of radiation otherwise present near the detector, such as scattering of the wirelessly-transmitted power). However, in alternate embodiments, the scattering signals can additionally or alternatively include active scattering signals (e.g., scattering of active probe signals transmitted for the purpose of object detection and/or characterization) and/or any other suitable scattering signals. S220 is preferably performed at one or more detectors (e.g., including one or more detector antennas), but can additionally or alternatively be performed at any other suitable elements.

S220 is preferably performed in response to wireless power transmission (e.g., performed in S210), such as shown by way of example in FIG. 3B. However, S220 can additionally or alternatively be performed in response to output of any other suitable radiation and/or can be performed with any other suitable timing.

S220 preferably includes receiving RF signals (e.g., at and/or near the transmitted power frequency). The RF signals are preferably received at the detector antennas. The received signals are preferably scattering signals from objects interacting with the radiation transmitted in S210. These signals are preferably indicative of presence and/or motion of these interacting objects (e.g., wherein the signals include and/or are indicative of Doppler information, such as Doppler frequency shifts). However, S220 can additionally or alternatively include receiving any other suitable signals in any suitable manner.

S220 can optionally include downmixing the received RF signals. For example, the received signals can be converted to intermediate frequency (IF) and/or baseband (BB) signals (e.g., in or around the range 0-120 Hz). The signals can be downmixed at a heterodyne mixer (and/or in any other suitable manner). In some examples, the signals can be downmixed using the same signal transmitted by the power transmitter (and/or a signal associated with and/or used to generate the transmitted signal, such as a local oscillator signal of the power transmitter). However, the signals can additionally or alternatively be downmixed in any other suitable manner, can be otherwise altered, and/or can be substantially unaltered.

S220 can optionally include providing the signals for analysis. The signals are preferably provided after downmixing (e.g., to intermediate frequency and/or baseband), but can additionally or alternatively be provided without alteration and/or provided in any other suitable form. The signals are preferably provided to the processing module, but can additionally or alternatively be provided to any other suitable elements.

However, S220 can additionally or alternatively include receiving any other suitable scattering signals in any other suitable manner.

3.3 Analyzing Scattering Signals

Analyzing scattering signals S230 preferably functions to determine whether the scattering signals are indicative of anomalous, unsafe, and/or potentially problematic conditions. S230 is preferably performed at the processing module, but can additionally or alternatively be performed by any other suitable elements.

S230 is preferably performed in response (e.g., immediately or substantially immediately in response) to receipt of signals for analysis (e.g., in response to scattering signals received in S220), but can additionally or alternatively be performed with any other suitable timing.

S230 preferably includes analyzing Doppler information associated with (e.g., included in) the scattering signals. Analyzing Doppler information preferably includes determining a spectral density (or a subset thereof) of the scattering signals (e.g., by Hilbert spectral analysis). For example, determining the spectral density can include determining frequency information (e.g., information indicative of Doppler shifts), such as by processing the received scattering signals with a plurality of filter banks in order to assign signal portions to different frequency bins. Further, determining the spectral density preferably includes determining Doppler shift intensities, such as by performing a Hilbert transform of the frequency bins described above in order to determine the associated amplitudes (and, optionally, phases and/or any other suitable information). How-ever, the spectral density can additionally or alternatively be determined in any other suitable manner.

S230 preferably includes analyzing the scattering signals based on the determined spectral density. This analysis preferably includes classifying the scattering signals (e.g., as nominal vs. anomalous, safe vs. unsafe, etc.), and/or otherwise determining information regarding the scattering signals (e.g., determining what sort of operating conditions the scattering signals are indicative of). Herein, a person of skill in the art will understand that classifying a scattering signal as having a certain trait can be analogous to determining that the scattering signal is indicative of operating conditions having that certain trait (e.g., wherein classifying a scattering signal as nominal can mean that the scattering signal is indicative of nominal operating conditions, classifying a signal as anomalous can mean the signal is indicative of anomalous operating conditions, classifying a signal as safe can mean the signal is indicative of safe operating conditions, classifying a signal as unsafe can mean the signal is indicative of unsafe operating conditions, etc.).

In a first example, the spectral density information is provided to a statistical classifier (e.g., a neural net, such as a convolutional neural net). For example, the spectral amplitudes (and, optionally, other information, such as the associated phase shifts) can be provided to a statistical classifier trained to perform the desired classification.

Figure 4A:
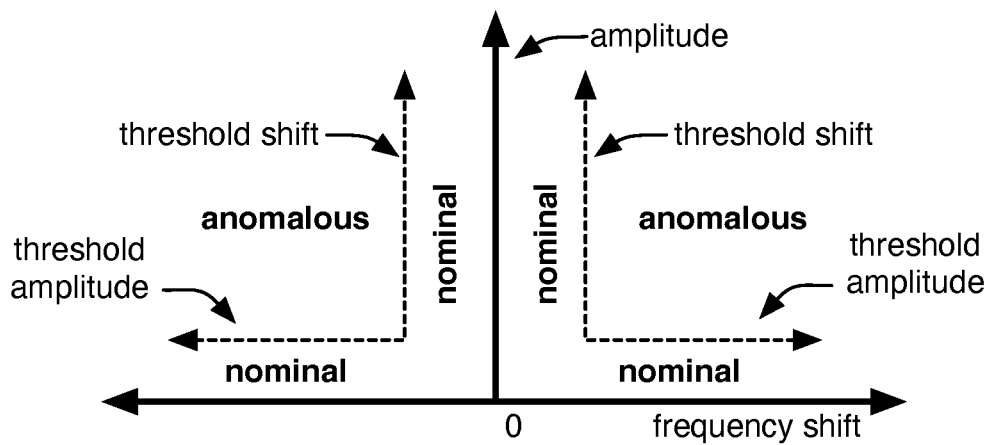
FIGS. 4A-4C are schematic representations of a first, second, and third example, respectively, of classification criteria of the method.
Figure 4B:
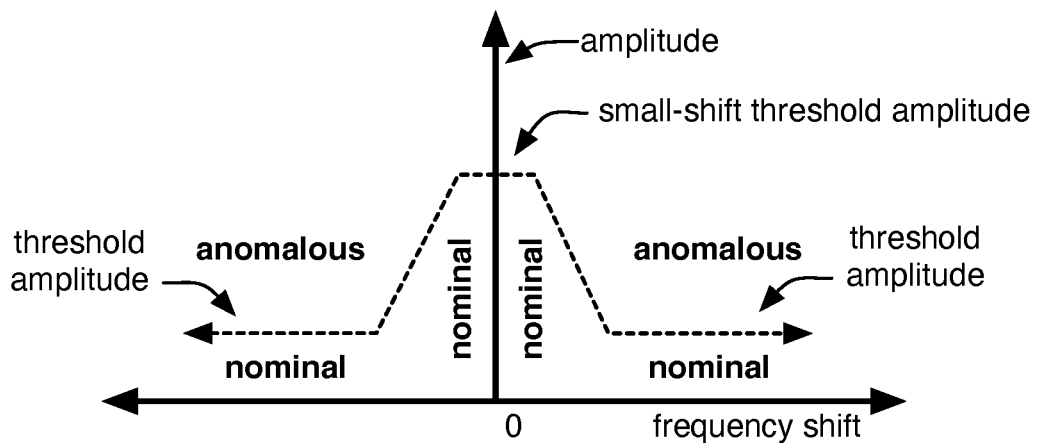
Figure 4C:
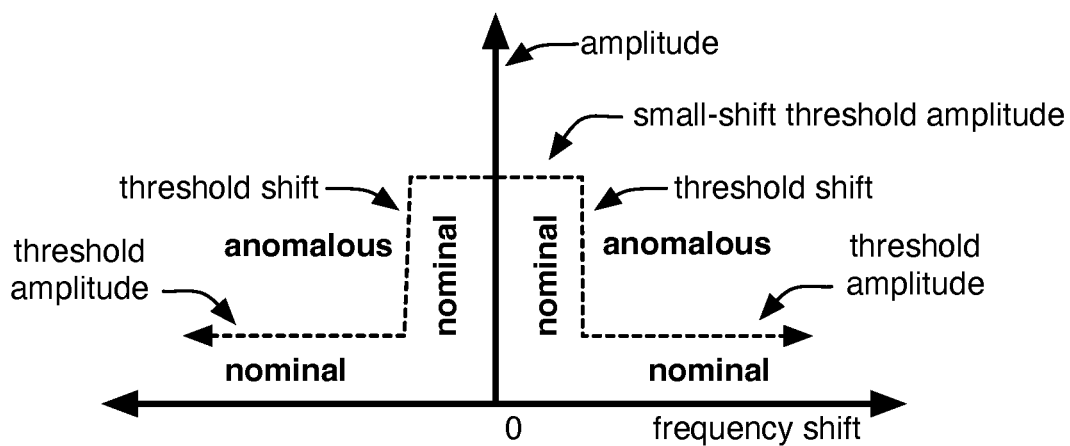

In a second example, the spectral density information can be classified based on heuristics. For example, the heuristics can be determined based on an expectation that higher intensities at smaller Doppler shifts may be normal and expected within the data, but that at larger Doppler shifts, only lower intensities may be normal, expected, or tolerable. In one example, the classification can be based on a tolerance of high (e.g., arbitrarily high, such as infinitely high, or up to but not exceeding a small-shift threshold amplitude) scattering intensities within a threshold frequency shift range (wherein a small frequency shift is indicative of a small radial velocity, and thus is unlikely to represent scattering off a moving object, such as a human or other living organism), but can tolerate only a low scattering intensity (e.g., lower than another threshold amplitude, wherein this threshold amplitude is less than the small-shift threshold amplitude) outside this threshold frequency shift range (e.g., wherein a larger frequency shift is indicative of a larger radial velocity, and thus is more likely to be indicative of scattering off a human or other living organism), such as shown by way of examples in FIGS. 4A-4C.

In a third example, the spectral density information can be classified using one or more changepoint detection algorithms (e.g., online or streaming changepoint detection algorithms, such as Bayesian online changepoint detection algorithms).

However, the spectral density information can additionally or alternatively be analyzed in any other suitable manner.

In some embodiments, S230 can additionally or alternatively include analyzing unprocessed and/or lightly-processed scattering signals (e.g., I/Q signals, amplitude and phase signals, etc.) and/or analyzing scattering signals in any other suitable form. In some such embodiments, analyzing the scattering signals can include determining whether the signals are indicative of significant changes (e.g., as compared to previous values, such as recent values within the signal stream and/or historical values). In a first example, a significant change (e.g., exceeding one or more threshold values) in one or more rolling means (or other measure of central tendency for the signal stream(s)) can be indicative of a potential unsafe or anomalous condition. In a second example, a significant change (e.g., exceeding one or more threshold values) in standard deviation (or other measure of variance for the signal stream(s)) can be indicative of a potential unsafe or anomalous condition. In a third example, one or more changepoint detection algorithms (e.g., online or streaming changepoint detection algorithms, such as Bayesian online changepoint detection algorithms) can be used to determine that the data is indicative of a potential unsafe or anomalous condition. However, the scattering signals can additionally or alternatively be analyzed in any other suitable manner.

In some embodiments, S230 can additionally or alternatively include receiving and/or analyzing auxiliary information, such as information sampled by one or more auxiliary sensors of the system (e.g., cameras, ultrasound sensors, ultra wideband sensors, etc.). In some such embodiments, S230 can include: analyzing the scattering signals (e.g., as described above), analyzing the auxiliary information, and/or performing sensor fusion based on the scattering signals and some or all of the auxiliary information. In some examples, S230 can additionally or alternatively include analyzing the scattering signals and/or auxiliary information in light of one or more models of electromagnetic field strength (e.g., wherein the scattering signals and/or auxiliary information can be indicative of a position of a person, and the model can be indicative of electromagnetic field strength at the indicated position), such as to determine information about potential interactions between the electromagnetic fields and people (e.g., whether the electromagnetic field strength exceeds a safety threshold at or near a person; whether a person is expected to enter or come close to a region in which the electromagnetic field strength exceeds a safety threshold, such as based on a trajectory and/or velocity of the person; which regions are expected to have electromagnetic field strengths in excess of a safety threshold, etc.).

Further, S230 can additionally or alternatively include analyzing the scattering signals in any other suitable manner.

3.4 Acting Based on the Analysis

Acting based on the analysis S240 preferably functions to ensure and/or enhance safe operation of the power transmitters. S240 is preferably performed in response to performance of S230 (e.g., in response to detection of anomalous and/or unsafe scattering signals). S240 is preferably performed at the processing module, but can additionally or alternatively be performed by any other suitable elements.

In one embodiment, S240 includes controlling the power transmitters to alter the characteristics of power transmission. In a first example, this can include halting and/or pausing power transmission. The transmission can be halted for a threshold period of time, halted until a restart command is received, halted until safety of the transmission is otherwise confirmed (e.g., based on indications from one or more auxiliary sensors that the intended transmission region is unobstructed), and/or halted for any other suitable time.

In a second example, the power transmission can be redirected. For example, the configuration of the power transmitter phased array can be altered in order to aim the radiation in a different direction (e.g., toward a different power receiver). If the resulting scattering signals are no longer indicative of anomalous and/or unsafe conditions after this redirection, power transmission can safely proceed under this new configuration (e.g., until safety of the original configuration can be confirmed).

In a third example, the power transmitter can be controlled to reduce its output power (e.g., significantly reduce the output power). Reducing output power can ensure that obstructions (e.g., causing the scattering) do not receive radiation above a safety threshold (e.g., receive no more than a threshold amount of power or energy). For example, the output power can be reduced based on the scattering intensity (e.g., reduced such that scattering intensity associated with the scattering object of interest is lower than a threshold value). In this example, the method can include continuing to monitor the scattering intensity (e.g., of the scattering object of interest) and tuning the power transmitter output power to ensure that the monitored scattering intensity remains sufficiently low. This monitoring (and optional tuning) can enable resumption of high and/or full-power transmission once the obstruction is clear, or substantially clear, of the desired transmission path.

Additionally or alternatively, S240 can include presenting information associated with the analysis (e.g., to one or more people in the vicinity of the system, to one or more users controlling and/or monitoring safety of operations performed in the vicinity of the system, etc.). In one embodiment, information based on models of electromagnetic fields (e.g., expected electromagnetic field strengths in different regions in the vicinity of the system) can be used to determine appropriate information to present. In examples, such information can include: information indicative of one or more expected safe and/or unsafe regions (e.g., presented on a map, presented as a warning to stay at least a certain distance from an indicator, etc.), information indicative of current and/or expected incursions into a region that may be unsafe (e.g., alarm sound, flashing light, user device notification, etc.), and/or any other suitable information. However, S240 can additionally or alternatively include presenting any other suitable information in any suitable manner.

However, S240 can additionally or alternatively include taking any other suitable actions based on the scattering signal analysis. Further, the method 200 can additionally or alternatively include performing any other suitable elements in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for field detection, comprising:
   wirelessly transmitting power from a set of one or more transmitters to a set of one or more receivers, comprising transmitting propagating radio frequency (RF) radiation;
   while transmitting the propagating RF radiation, at a detector, receiving a first latent scattering signal at a first time;
   based on the first latent scattering signal, continuing to transmit propagating RF radiation, comprising classifying, at at least one processing module, the first latent scattering signal as nominal; and
   while transmitting the propagating RF radiation, at the detector, receiving a second latent scattering signal at a second time after the first time;
   classifying, at the at least one processing module, the second latent scattering signal as anomalous; and
   in response to classifying the second latent scattering signal as anomalous, altering transmission of the propagating RF radiation.

2. The method of claim 1, wherein classifying the second latent scattering signal as anomalous comprises, at the at least one processing module:
   determining Doppler information based on the second latent scattering signal and analyzing the Doppler information, wherein the Doppler information is indicative of the anomalous condition.

3. The method of claim 2, wherein the Doppler information is indicative of a Doppler shift exceeding a threshold amplitude and exceeding a threshold frequency shift magnitude, wherein the second latent scattering signal is classified as anomalous based on the Doppler shift exceeding the threshold amplitude and exceeding the threshold frequency shift magnitude.

4. The method of claim 3, wherein classifying the first latent scattering signal as nominal comprises determining first signal Doppler information based on the first latent scattering signal and analyzing the first signal Doppler information, wherein the first signal Doppler information is indicative of a first signal Doppler shift that does not exceed at least one of: the threshold amplitude or the threshold frequency shift magnitude.

5. The method of claim 4, wherein the first signal Doppler shift exceeds the threshold amplitude and does not exceed the threshold frequency shift magnitude.

6. The method of claim 5, wherein the first signal Doppler shift does not exceed a small-shift threshold amplitude greater than the threshold amplitude, wherein the first latent scattering signal is classified as nominal based on the first signal Doppler shift not exceeding the small-shift threshold amplitude.

7. The method of claim 2, wherein determining the Doppler information comprises: determining a spectral density of the second latent scattering signal, and determining the Doppler information based on the spectral density.

8. The method of claim 1, wherein classifying the second latent scattering signal as anomalous comprises, at the at least one processing module:
   determining a spectral density of the second latent scattering signal and analyzing the spectral density, wherein the spectral density is indicative of the anomalous condition.

9. The method of claim 8, wherein analyzing the spectral density comprises classifying the spectral density as anomalous using a statistical classifier.

10. The method of claim 9, wherein the statistical classifier comprises a convolutional neural net configured to accept information indicative of the spectral density.

11. The method of claim 1, wherein altering transmission of the propagating RF radiation comprises halting transmission of the propagating RF radiation.

12. The method of claim 11, further comprising, after halting transmission of the propagating RF radiation:
    resuming transmission of the propagating RF radiation;
    while transmitting the propagating RF radiation, at the detector, receiving a third latent scattering signal; and
    based on the third latent scattering signal, continuing to transmit propagating RF radiation, comprising, at the at least one processing module, classifying the third latent scattering signal as nominal.

13. The method of claim 1, wherein:
    before altering transmission of the propagating RF radiation, transmitting propagating RF radiation comprises transmitting at nominal power; and
    altering transmission of the propagating RF radiation comprises transmitting at reduced power, wherein the reduced power is less than the nominal power.

14. The method of claim 13, further comprising:
    while transmitting at reduced power, at the detector, receiving a third latent scattering signal;
    classifying the third latent scattering signal as nominal; and
    in response to classifying the third latent scattering signal as nominal, resuming transmission at nominal power.

15. The method of claim 1, wherein altering transmission of the propagating RF radiation comprises redirecting the propagating RF radiation.

16. The method of claim 15, further comprising:
    after redirecting the propagating RF radiation, while transmitting the propagating RF radiation, at the detector, receiving a third latent scattering signal;
    classifying the third latent scattering signal as anomalous; and
    in response to classifying the third latent scattering signal as anomalous, further altering transmission of the propagating RF radiation, comprising at least one of: halting transmission of the propagating RF radiation or transmitting at reduced power.

17. The method of claim 15, wherein:
    the set of receivers comprises a plurality of receivers;
    at the second time, transmitting the propagating RF radiation comprises transmitting based on a first transmission configuration associated with a first receiver group, the first receiver group comprising a first subset of the plurality of receivers;

redirecting the propagating RF radiation comprises transmitting based on a second transmission configuration associated with a second receiver group, the second receiver group comprising a second subset of the plurality of receivers;

the first receiver group is different from the second receiver group; and the first transmission configuration is different from the second transmission configuration.

18. The method of claim 17, further comprising, before the first time:

determining the first transmission configuration, comprising performing a first optimum search for wireless power transmission to the first receiver group; and determining the second transmission configuration, comprising performing a second optimum search for wireless power transmission to the second receiver group.

19. The method of claim 18, further comprising, before the first time, determining a charging plan, the charging plan comprising:

a first duty cycle associated with the first transmission configuration; and a second duty cycle associated with the second transmission configuration; wherein:

before altering transmission of the propagating RF radiation, wirelessly transmitting power is performed according to the charging plan; and redirecting the propagating RF radiation deviates from the charging plan.

20. The method of claim 17, wherein the first receiver group comprises a first receiver and a second receiver.

21. The method of claim 1, further comprising, while transmitting the propagating RF radiation, at one or more receivers of the set:

receiving power from the set of one or more transmitters; and providing at least a portion of the received power to one or more electrical loads.

* * * * *